United States Patent
Miller

(10) Patent No.: US 10,155,472 B1
(45) Date of Patent: Dec. 18, 2018

(54) LIFT GATE LIGHTING SYSTEM WITH REMOTE LIGHT SOURCE

(71) Applicant: GM GLOBAL TECHNOLOGY OPERATIONS LLC, Detroit, MI (US)

(72) Inventor: Daniel H. Miller, Berkley, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/624,941

(22) Filed: Jun. 16, 2017

(51) Int. Cl.
| | |
|---|---|
| *B60J 5/10* | (2006.01) |
| *B60Q 1/00* | (2006.01) |
| *B60Q 1/24* | (2006.01) |
| *B60Q 1/30* | (2006.01) |
| *F21V 5/04* | (2006.01) |
| *F21V 23/00* | (2015.01) |
| *F21S 45/10* | (2018.01) |

(52) U.S. Cl.
CPC ................ *B60Q 1/24* (2013.01); *B60J 5/101* (2013.01); *B60Q 1/0041* (2013.01); *B60Q 1/30* (2013.01); *F21S 45/10* (2018.01); *F21V 5/04* (2013.01); *F21V 23/003* (2013.01)

(58) Field of Classification Search
CPC .......... B60J 5/101; B60Q 1/30; F21V 7/0016
USPC ................................................. 362/459–549
See application file for complete search history.

(56) References Cited

U.S. PATENT DOCUMENTS 4,420,797 A * 12/1983 Tohata ..................... B60J 5/101
362/496

* cited by examiner

*Primary Examiner* — William J Carter
(74) *Attorney, Agent, or Firm* — Lorenz & Kopf, LLP

(57) ABSTRACT

A lighting system for a lift gate of a vehicle is provided. The lighting system includes a light source that emits at least a first light beam. The light source is coupled to the vehicle at a first location remote from the lift gate. The lighting system includes an optical system coupled to the lift gate having a first optic member aligned with the light source that receives the first light beam. The optical system is illuminated by the light source at the first location remote from the lift gate.

18 Claims, 4 Drawing Sheets

LIFT GATE LIGHTING SYSTEM WITH REMOTE LIGHT SOURCE

TECHNICAL FIELD

The present disclosure generally relates to vehicles, and more particularly relates to a lighting system with a remote light source for a lift gate of a vehicle.

BACKGROUND

Certain vehicles, such as motor vehicles, include a lift gate, which is movable relative to a portion of the vehicle to enable access to a cargo area. Generally, the lift gate is positioned at a rear of the vehicle, and the rear of the vehicle is subject to certain photometric requirements. Typically, in order to meet the photometric requirements, one or more light sources, such as LEDS, are coupled to the lift gate. Coupling the light sources to the lift gate, however, may increase the complexity of the lift gate. For example, the light sources may need to be coupled to a wiring harness routed through a portion of the lift gate to supply power to the light sources from a source remote from the lift gate. In addition, one or more heat sinks may need to be employed with the light sources, etc.

Accordingly, it is desirable to provide a remote light source for a lift gate of a vehicle, which reduces the complexity of the illumination of the rear of the vehicle while also meeting photometric requirements for the rear of the vehicle. Furthermore, other desirable features and characteristics of the present disclosure will become apparent from the subsequent detailed description and the appended claims, taken in conjunction with the accompanying drawings and the foregoing technical field and background.

SUMMARY

According to various embodiments, provided is a lighting system for a lift gate of a vehicle. The lighting system includes a light source that emits at least a first light beam. The light source is coupled to the vehicle at a first location remote from the lift gate. The lighting system includes an optical system coupled to the lift gate having a first optic member aligned with the light source that receives the first light beam. The optical system is illuminated by the light source at the first location remote from the lift gate.

The light source includes a first light source that emits the first light beam and a second light source that emits a second light beam. The optical system includes a second optic member aligned with the second light source that receives the second light beam to illuminate the second optic member. The optical system includes an inner bezel that has a body that defines a first chamber that receives the first optic member and a second chamber that receives the second optic member. A first channel is defined through the inner bezel so as to be in communication with the first chamber and a second channel is defined through the inner bezel so as to be in communication with the second chamber. The optical system includes a housing that couples the optical system to the lift gate. The housing includes a recess that receives the inner bezel. The housing defines a first bore in communication with the first channel and a second bore in communication with the second channel. The first light source is coupled at the first location remote from the lift gate so as to be aligned with the first bore of the housing and the second light source is coupled at a second location remote from the lift gate so as to be aligned with the second bore of the housing. The light source is coupled to a tail lamp assembly of the vehicle. The light source emits the first light beam along an axis that is substantially perpendicular to a longitudinal axis of the vehicle.

In various embodiments, a lighting system for a lift gate of a vehicle is provided. The lighting system includes a first light source that emits a first light beam. The first light source is coupled to the vehicle at a first location remote from the lift gate. The lighting system includes a second light source that emits a second light beam. The second light source is coupled to the vehicle at a second location remote from the lift gate. The lighting system includes an optical system coupled to the lift gate having a first optic member aligned with the first light source that receives the first light beam and a second optic member aligned with the second light source that receives the second light beam. The optical system is illuminated by both of the first light source at the first location remote from the lift gate and the second light source at the second location remote from the lift gate.

The optical system includes an inner bezel that has a body that defines a first chamber that receives the first optic member and a second chamber that receives the second optic member. A first channel is defined through the inner bezel so as to be in communication with the first chamber and a second channel is defined through the inner bezel so as to be in communication with the second chamber. The optical system includes a housing that couples the optical system to the lift gate. The housing includes a recess that receives the inner bezel. The housing defines a first bore in communication with the first channel and a second bore in communication with the second channel. The first light source is coupled at the first location remote from the lift gate so as to be aligned with the first bore of the housing and the second light source is coupled at the second location remote from the lift gate so as to be aligned with the second bore of the housing. The first light source and the second light source are each coupled to a tail lamp assembly of the vehicle and are spaced apart from each other. The first light source emits the first light beam along an axis that is substantially perpendicular to a longitudinal axis of the vehicle.

In various embodiments, a vehicle is provided. The vehicle includes a body having a lift gate coupled to a rear of the vehicle. The vehicle includes a tail lamp assembly coupled to the body adjacent to the lift gate. The vehicle includes a first light source that emits a first light beam. The first light source is coupled to the tail lamp assembly and is remote from the lift gate. The vehicle includes a second light source that emits a second light beam. The second light source is coupled to the tail lamp assembly and remote from the lift gate. The vehicle includes an optical system coupled to the lift gate having a first optic member aligned with the first light source that receives the first light beam and a second optic member aligned with the second light source that receives the second light beam. The optical system is illuminated solely by the first light source and the second light source that are remote from the lift gate.

The optical system includes an inner bezel that has a body that defines a first chamber that receives the first optic member and a second chamber that receives the second optic member. A first channel is defined through the inner bezel so as to be in communication with the first chamber and a second channel is defined through the inner bezel so as to be in communication with the second chamber. The optical system includes a housing that couples the optical system to the lift gate. The housing includes a recess that receives the inner bezel. The housing includes a first bore in communication with the first channel and a second bore in communication with the second channel. The first light source is coupled remote from the lift gate so as to be aligned with the first bore of the housing and the second light source is coupled remote from the lift gate so as to be aligned with the second bore of the housing. The second light source emits the second light beam along an axis that is substantially perpendicular to a longitudinal axis of the vehicle.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of schematic, functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the vehicle systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
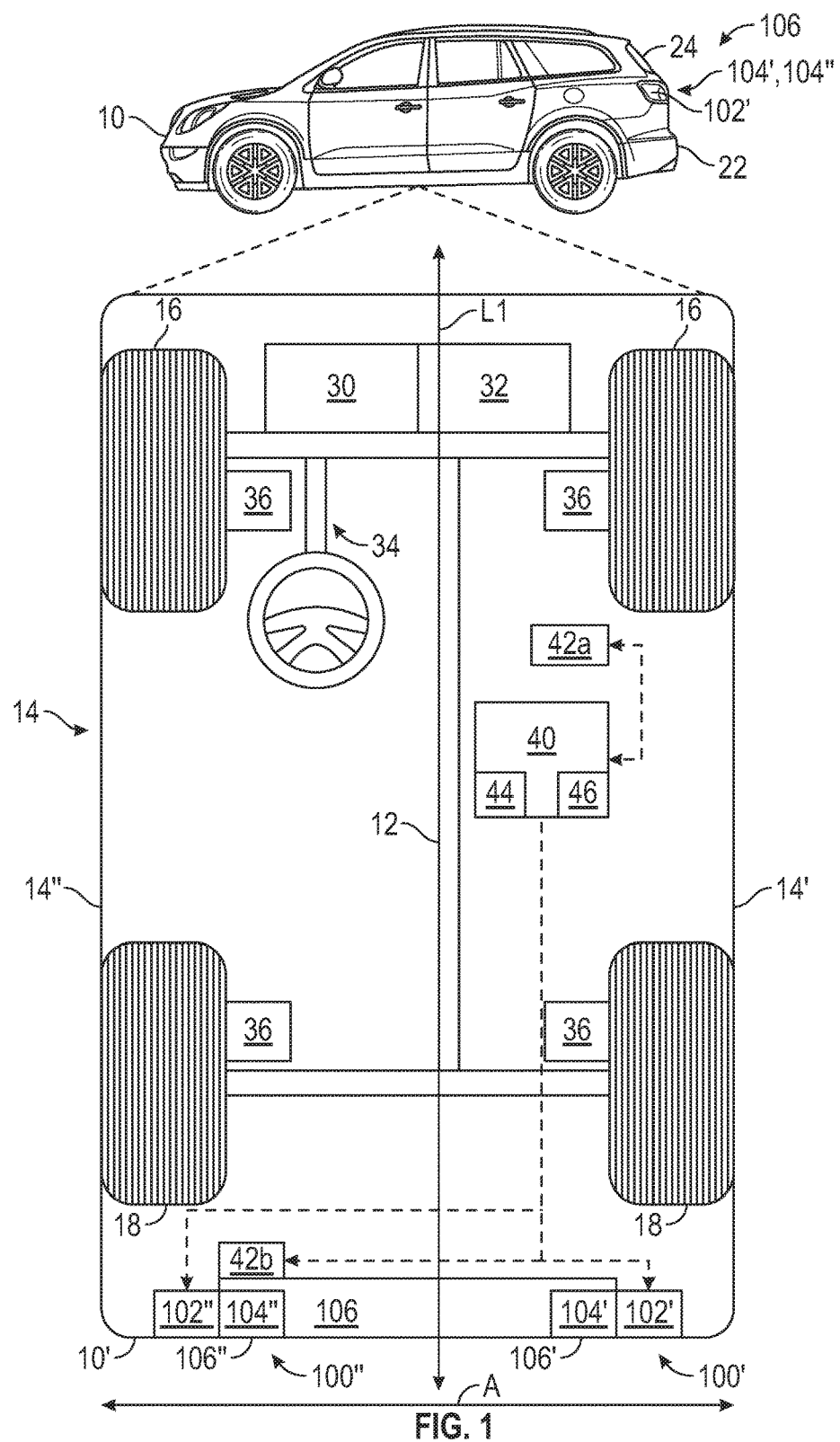
FIG. 1 is a functional block diagram illustrating a vehicle having a lift gate lighting system, which includes a pair of lift gate optical systems each having a respective remote light source, in accordance with various embodiments.

With reference to FIG. 1, a lift gate lighting system shown generally at 100 is associated with a vehicle 10 in accordance with various embodiments. In general, the lift gate lighting system 100 includes one or more remote light sources 102 that provide light output or emit light to illuminate one or more lift gate optical systems 104. In the following example, the vehicle 10 includes two remote light sources 102', 102" that illuminate a respective one of two lift gate optical systems 104', 104". Thus, in this example, the vehicle 10 includes two gate lighting systems 100', 100", which meet the photometric requirements for a rear 10' of the vehicle 10. As will be discussed, the remote light sources 102 are not coupled to a lift gate 106 of the vehicle 10, which reduces complexity of the lift gate 106. Although the figures shown herein depict an example with certain arrangements of elements, additional intervening elements, devices, features, or components may be present in an actual embodiment. It should also be understood that FIG. 1 is merely illustrative and may not be drawn to scale. In addition, one or more components of the vehicle 10 may be described herein as being in "optical communication" with another component. It should be understood that the phrase "optical communication" is used herein to denote components that transmit light between each other.

As depicted in FIG. 1, the vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14. In various embodiments, the vehicle 10 includes the lift gate 106.

The lift gate 106 is pivotally coupled to the frame of the vehicle 10 to be movable between an opened position and a closed position by one or more hydraulic cylinders, for example. In this example, the lift gate 106 is coupled to rear 10' of the vehicle 10, so as to be movable by the one or more hydraulic cylinders relative to a first side body panel 14' of the body 14 and a second side body panel 14" of the body 14. The lift gate 106 has a first side 106' adjacent to the first side body panel 14' and a second side 106" adjacent to the second side body panel 14". In one example, the lift gate 106 has an exterior surface, which is defined by a panel 22 and a transparent or glass panel 24. The panel 22 is generally composed of a metal or metal alloy, and may be stamped, cast, forged, etc. The panel 22 may receive and support the glass panel 24. In various embodiments, the lift gate optical system 104 is coupled to the panel 22.

In this example, the lift gate optical system 104" is coupled to the panel 22 so as to be positioned at the first side 106' of the lift gate 106; and the lift gate optical system 104" is coupled to panel 22 so as to be positioned at the second side 106" of the lift gate 106. As will be discussed, the remote light source 102" is coupled to the first side body panel 14' of the body 14; and the remote light source 102" is coupled to the second side body panel 14" such that the remote light sources 102', 102" are substantially aligned with a respective one of the lift gate optical systems 104', 104". The vehicle 10 is depicted in the illustrated embodiment as a sport utility vehicle (SUV), but it should be appreciated that any other vehicle including trucks, passenger cars, recreational vehicles (RVs), marine vessels, aircraft, etc., can also be used.

As shown, the vehicle 10 generally includes a propulsion system 30, a transmission system 32, a steering system 34, a brake system 36, a controller 40 and one or more sensing devices 42. The propulsion system 30 may, in various embodiments, include an internal combustion engine, an electric machine such as a traction motor, and/or a fuel cell propulsion system. The transmission system 32 is configured to transmit power from the propulsion system 30 to the wheels 16-18 according to selectable speed ratios. According to various embodiments, the transmission system 32 may include a step-ratio automatic transmission, a continuously-variable transmission, or other appropriate transmission. The brake system 36 is configured to provide braking torque to the wheels 16-18 and/or the transmission system 32. The brake system 36 may, in various embodiments, include friction brakes, brake by wire, a regenerative braking system such as an electric machine, and/or other appropriate braking systems. The steering system 34 influences the course of travel by the vehicle 10, for example by adjusting a position of the wheels 16-18.

The one or more sensing devices 42 observe conditions associated with the vehicle 10 and/or an environment surrounding the vehicle 10 and generate sensor signals based thereon. In various embodiments, the sensing devices 42 include an automatic headlamp sensing device 42a, which observes an amount of light external to the vehicle 10 and generates sensor signals based thereon. In various embodiments, the sensing devices 42 also include a door ajar sensing device 42b, which observes a position of the lift gate 106 relative to the body 14 and generates sensor signals based thereon. The sensing devices 42 are in communication with the controller 40 over a communication medium that facilitates the transfer of power, commands, etc.

The controller 40 includes at least one processor 44 and a computer readable storage device or media 46. The processor 44 can be any custom made or commercially available processor, a central processing unit (CPU), a graphics processing unit (GPU), an auxiliary processor among several processors associated with the controller 40, a semiconductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 40 in controlling various components of the vehicle 10, such as the remote light sources 102', 102".

The instructions may include one or more separate programs, each of which comprises an ordered listing of executable instructions for implementing logical functions. The instructions, when executed by the processor 44, perform logic, calculations, methods and/or algorithms for controlling the components of the vehicle 10, and generate control signals to the various components of the vehicle 10 based on the logic, calculations, methods, and/or algorithms. Although only one controller 40 is shown in FIG. 1, embodiments of the vehicle 10 can include any number of controllers 40 that communicate over any suitable communication medium or a combination of communication mediums and that cooperate to process the sensor signals, perform logic, calculations, methods, and/or algorithms, and generate control signals to control features of the vehicle 10.

In various embodiments, one or more instructions of the controller 40 are associated with the lift gate lighting system 100, 100' and, when executed by the processor 44, the instructions receive and process signals to output one or more control signals to the lift gate lighting system 100, 100'. The instructions of the controller 40, when executed by the processor 44, process sensor signals from the automatic headlamp sensing device 42a and determine whether to output one or more control signals to the remote light sources 102, 102' to illuminate the lift gate optical systems 104', 104". For example, the instructions of the controller 40, when executed by the processor 44, may process the sensor signals from the automatic headlamp sensing device 42a, determine that the ambient lighting conditions (e.g. lighting conditions external to the vehicle 10) are low and output the one or more control signals to the remote light sources 102, 102', thereby illuminating the lift gate optical systems 104', 104". The instructions of the controller 40, when executed by the processor 44, may also process sensor signals from the door ajar sensing device 42b and determine whether to output one or more control signals to the remote light sources 102, 102' to illuminate the lift gate optical systems 104', 104". For example, the instructions of the controller 40, when executed by the processor 44, may process the sensor signals from the door ajar sensing device 42b, determine that the lift gate 106 is in a closed position adjacent to the first side 14' and the second side 14" of the body 14, and output the one or more control signals to the remote light sources 102, 102', thereby illuminating the lift gate optical systems 104', 104". As a further example, the instructions of the controller 40, when executed by the processor 44, may process the sensor signals from the door ajar sensing device 42b, determine that the lift gate 106 is in an opened position spaced apart from the first side 14' and the second side 14" of the body 14, and determine to not output the one or more control signals as the lift gate 106 is ajar.

In further examples, the instructions of the controller 40, when executed by the processor 44, process data received from other control modules of the vehicle 10 and determine whether to output one or more control signals to the remote light sources 102, 102' to illuminate the lift gate optical systems 104', 104". For example, the instructions of the controller 40, when executed by the processor 44, process data received from other control modules of the vehicle 10 and determine whether to output one or more control signals to the remote light sources 102, 102' to illuminate the lift gate optical systems 104', 104" based on a signal that indicates that the headlight switch in the on position. In a further example, the instructions of the controller 40, when executed by the processor 44, process data received from other control modules of the vehicle 10 and determine whether to output one or more control signals to the remote light sources 102, 102' to illuminate the lift gate optical systems 104', 104" based on a signal that indicates that the brake system 36 is activated. In another example, the instructions of the controller 40, when executed by the processor 44, process data received from other control modules of the vehicle 10 and determine whether to output one or more control signals to the remote light sources 102, 102' to illuminate the lift gate optical systems 104', 104" based on a signal that indicates that a turn signal associated with the vehicle 10 is activated. In another example, the instructions of the controller 40, when executed by the processor 44, process data received from other control modules of the vehicle 10 and determine whether to output one or more control signals to the remote light sources 102, 102' to illuminate the lift gate optical systems 104', 104" based on a signal that indicates that a hazard switch is in an on position or activated. In a further example, the instructions of the controller 40, when executed by the processor 44, process data received from other control modules of the vehicle 10 and determine whether to output one or more control signals to the remote light sources 102, 102' to illuminate the lift gate optical systems 104', 104" based on a signal that indicates that the transmission system 32 of the vehicle 10 is in a reverse range.

Figure 2:
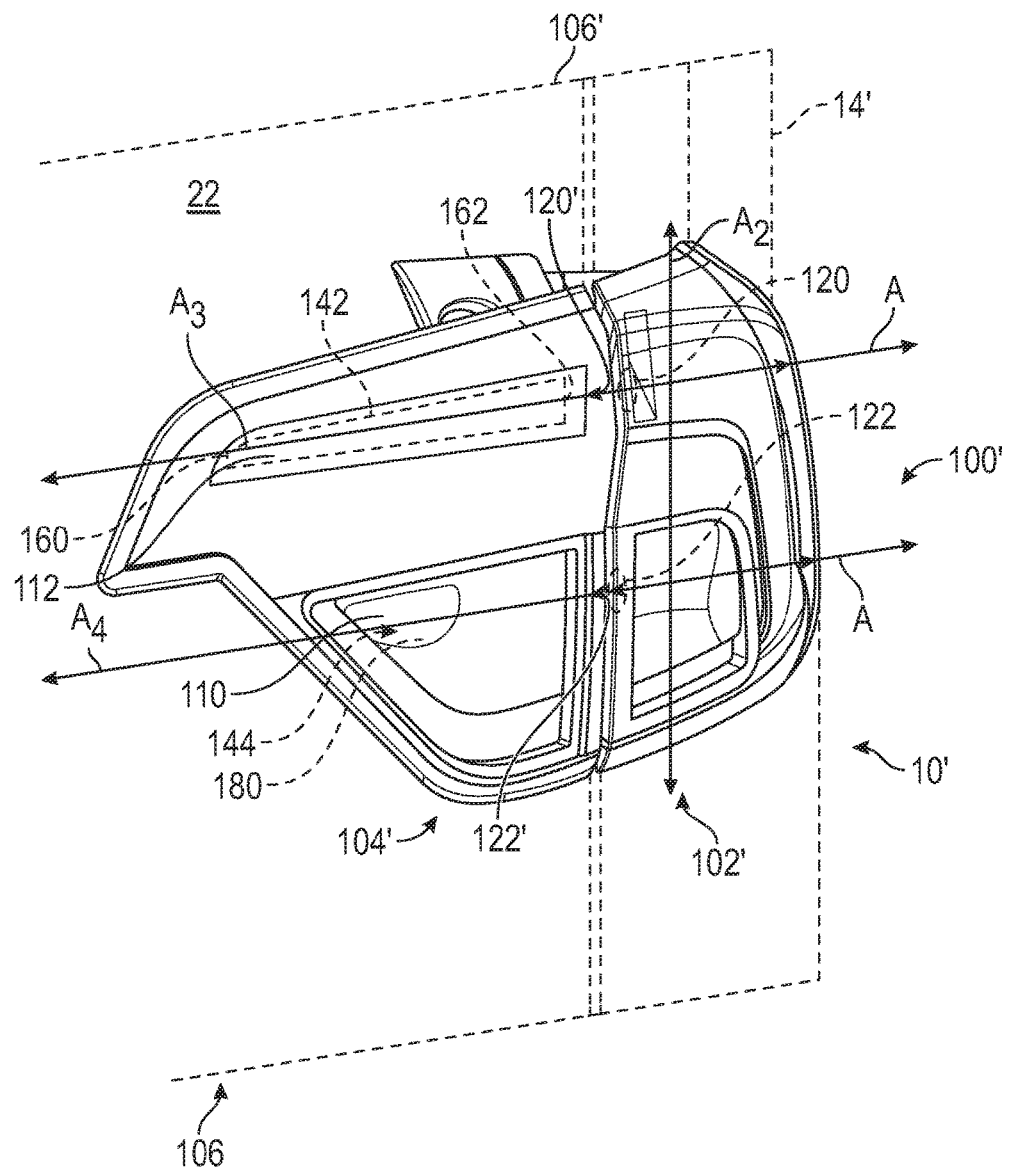
FIG. 2 is a perspective view of one of the lift gate optical systems and the respective remote light source of FIG. 1 in accordance with various embodiments.

Referring now to FIG. 2, the lift gate lighting system 100' is shown in greater detail. As the lift gate lighting system 100' is substantially the same as the lift gate lighting system 100", for ease of the description, only one of the lift gate lighting systems 100', 100" will be described in detail herein. The lift gate lighting system 100' includes the remote light source 102' and the lift gate optical system 104'. As shown, the remote light source 102' is coupled to the first side body panel 14' and the lift gate optical system 104' is coupled to the first end 106' of the lift gate 106 on the panel 22. Generally, the remote light source 102' and the lift gate optical system 104' are substantially coplanar. The remote light source 102' is aligned with the lift gate optical system 104' such that light output from the remote light source 102' illuminates the lift gate optical system 104' in one or more areas, as shown by reference numerals 110 and 112. It should be noted that the shape of the remote light source 102' and the lift gate optical system 104' illustrated herein is merely exemplary, as the various teachings of the present disclosure are applicable to lift gate lighting systems having different shapes.

Figure 3:
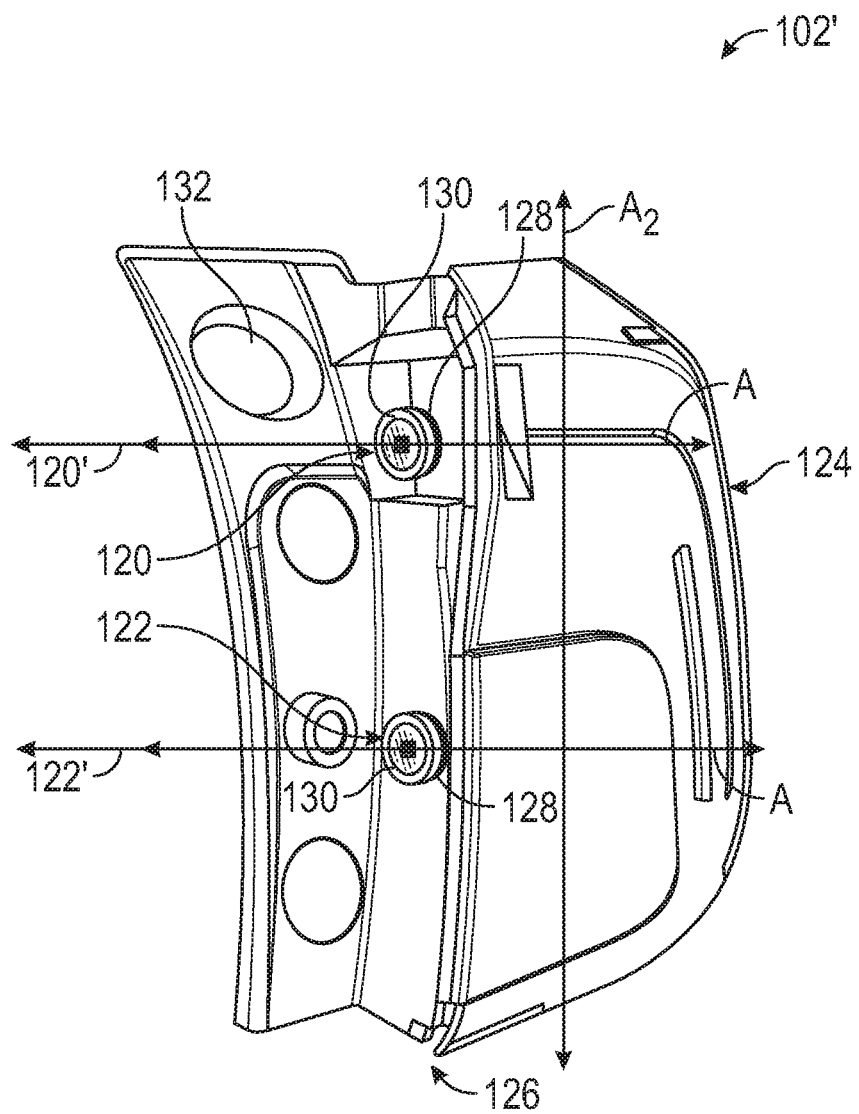
FIG. 3 is a perspective view of the remote light source of FIG. 2 in accordance with various embodiments.

With reference to FIG. 3, the remote light source 102' is shown in more detail. In this example, the remote light source 102' includes a first light source 120 and a second light source 122. The first light source 120 and the second light source 122 are each coupled to or mounted on a tail lamp assembly 124 of the vehicle 10. Generally, the first light source 120 and the second light source 122 are coupled to the tail lamp assembly 124 so as to receive power from the controller 40 via a wiring harness of the tail lamp assembly 124, for example. Stated another way, the first light source 120 and the second light source 122 are in communication with the controller 40 over a communication medium, such as a wiring harness associated with the tail lamp assembly 124 to receive power to illuminate. The first light source 120 is coupled to the tail lamp assembly 124 at a first location, and the second light source 122 is coupled to the tail lamp assembly 124 at a second location such that the first light source 120 is spaced apart from the second light source 122 on the tail lamp assembly 124. The first location and the second location are remote from the lift gate 106.

Each of the first light source 120 and the second light source 122 include, but are not limited to, light emitting diodes (LEDs), lasers, etc. In one example, the first light source 120 is a red LED or laser, which emits a red-colored light beam 120'; and the second light source 122 is a white LED or laser, which emits a white-colored light beam 122'. The first light source 120 and the second light source 122 are coupled to the tail lamp assembly 124 such that the light beams 120', 122' output by the respective one of the first light source 120 and the second light source 122 are directed along an axis A, which is substantially perpendicular to an axis A2 of the tail lamp assembly 124. In addition, the axis A is substantially perpendicular to a longitudinal axis L1 of the vehicle 10 (FIG. 1). In one example, a housing 126 of the tail lamp assembly 124 includes a pair of recesses 128 through which a portion of a respective one of the first light source 120 and the second light source 122 extend. Generally, a sealing member, including, but not limited to, a gasket 130, is positioned about each of the first light source 120 and the second light source 122. The gasket 130 surrounds the respective one of the first light source 120 and the second light source 122 to protect the first light source 120 and the second light source 122 from an environment of and surrounding the vehicle 10. It should be noted, however, that the first light source 120 and the second light source 122 may be positioned wholly within the tail lamp assembly 124 and enclosed by a transparent portion of the housing 126, if desired. As shown, the tail lamp assembly 124 may also include at least one mounting bore 132, which receives a mechanical fastener, to couple the tail lamp assembly 124, including the first light source 120 and the second light source 122, to the first side body panel 14' of the body 14.

With reference back to FIG. 2, the light beams 120', 122' of each of the first light source 120 and the second light source 122 are directed toward the lift gate optical system 104'. In this example, the light beam 120' is directed toward a first optic member 142 of the lift gate optical system 104'; and the light beam 122' is directed toward a second optic member 144 of the lift gate optical system 104'. Thus, the light beams 120', 122' supply light output to illuminate the first optic member 142 and the second optic member 144 without coupling a light source to the lift gate optical system 104'. As the light beam 120' is red in color, the first optic member 142 is illuminated red upon activation of the first light source 120. As the light beam 122' is white in color, the second optic member 144 is illuminated white upon activation of the first light source 120. Thus, the rear 10' of the vehicle 10 may be properly illuminated without requiring light sources, such as the first light source 120 and the second light source 122, on the lift gate 106. This reduces a complexity of the lift gate 106. It should be noted that while the first light source 120 and the second light source 122 are described herein as comprising colored light sources (red LED or laser and white LED or laser), the first light source 120 and the second light source 122 may both be white LEDs or lasers, and one or more of the first optic member 142 and the second optic member 144 may be formed to have a color.

Figure 4:
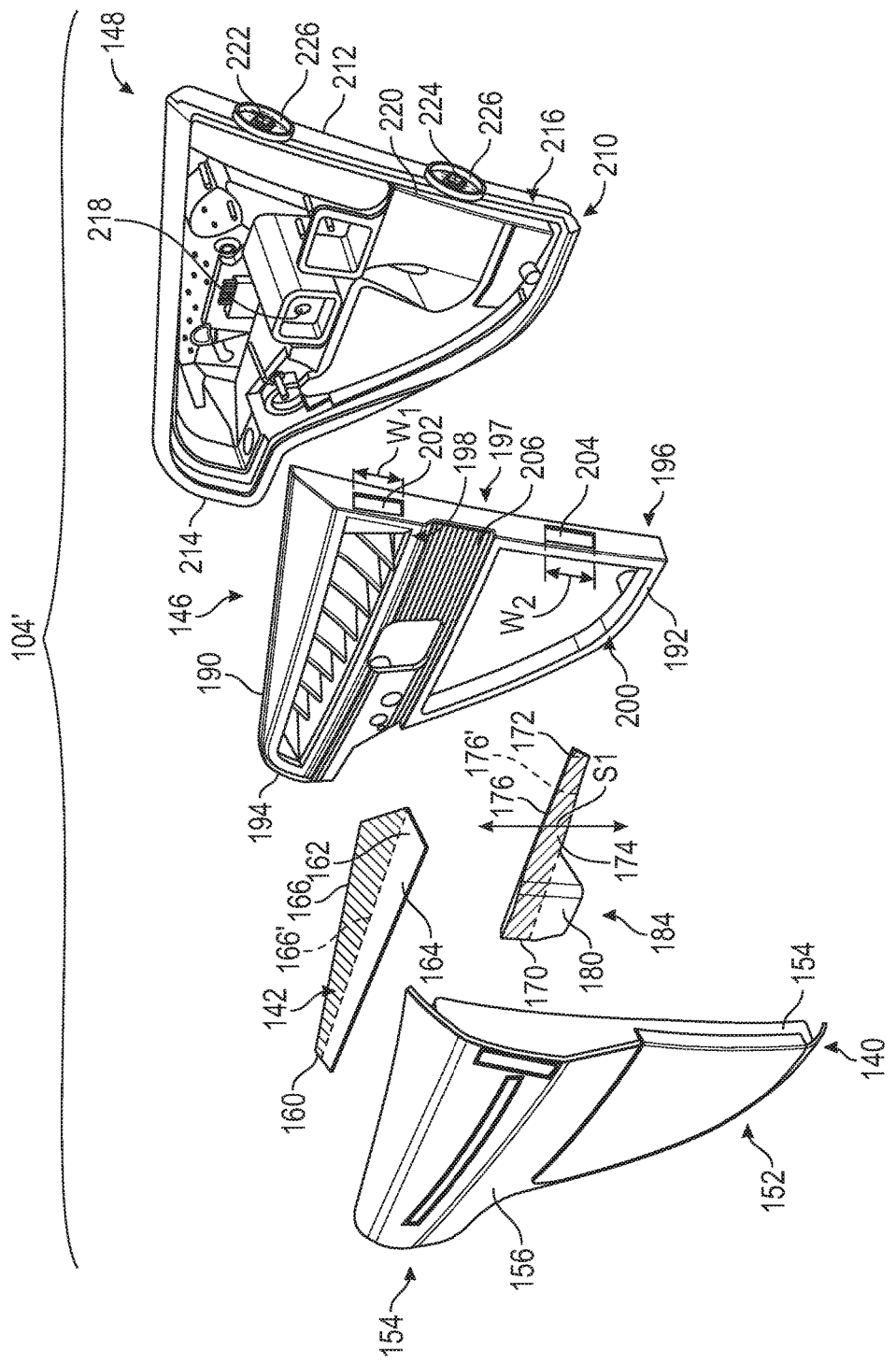
FIG. 4 is an exploded view of the lift gate optical system of FIG. 2 in accordance with various embodiments.

In one example, with reference to FIG. 4, the lift gate optical system 104' includes an outer lens 140, the first optic member 142, the second optic member 144, an inner bezel 146 and a housing 148. It should be noted that although the first optic member 142 and the second optic member 144 are described and illustrated herein as being discrete from the inner bezel 146, the first optic member 142 and the second optic member 144 may be integrally formed with the inner bezel 146, if desired. The outer lens 140 has a first translucent portion 150 and a second transparent portion 152. Each of the first translucent portion 150 and the second transparent portion 152 are generally composed of a polymeric material, including, but not limited to, a polycarbonate blend. The second transparent portion 152 is coupled to the first translucent portion 150, via ultrasonic welding, mechanical fasteners, adhesives, etc. to form the outer lens 140.

The first translucent portion 150 has four sides, and cooperates to define receptacle 154 for the second transparent portion 152. The first translucent portion 150 includes a light emitting portion 156 aligned with the first optic member 142 for illuminating the first translucent portion 150. In this example, at least the light emitting portion 156 of the first translucent portion 150 is formed so as to be red in color. As the light emitting portion 156 is red, when illuminated by the first optic member 142, the light emitting portion 156 emits red light, which cooperates with the tail lamp assembly 124 to define a tail light for the rear 10' of the vehicle 10.

The second transparent portion 152 is coupled to the receptacle 154 of the first translucent portion 150. The second transparent portion 152 is aligned with the second optic member 144 for illuminating the second transparent portion 152. In this example, second transparent portion 152 is formed so as to be devoid of color or clear. As the second transparent portion 152 is clear, when illuminated by the second optic member 144, the second transparent portion 152 emits white light, which cooperates with the tail lamp assembly 124 to define a reverse light for the rear 10' of the vehicle 10.

The first optic member 142 is optically coupled to the first light source 120 to receive the light beam 120' (FIG. 2) for illuminating the first optic member 142. The first optic member 142 is composed of a polymeric material, which is injection molded, extruded, printed, etc. The first optic member 142 may also be composed of glass. In this example, the first optic member 142 is substantially transparent or clear to receive the colored light from the first light source 120. The first optic member 142 is received within and coupled to the inner bezel 146, and generally has a shape that corresponds with a shape of the light emitting portion 156 of the outer lens 140 such that the illumination of the first optic member 142 substantially illuminates the light emitting portion 156 of the outer lens 140. In this example, the first optic member 142 has a substantially tapered tetrahedron shape. The first optic member 142 includes a first end 160, a second end 162, a first or front surface 164 and a second or rear surface 166.

The first end 160 is opposite the second end 162. With brief reference to FIG. 2, the first end 160 and the second end 162 extend along an axis A3, which is substantially coaxial with the axis A of the first light source 120. A surface area of the second end 162 is designed to receive sufficient light within a radius around the axis A3 that is greater than a radius of build tolerance variations that the interface between the remote light source 102' and the lift gate optical system 104' is restricted to. With reference back to FIG. 4, the front surface 164 is opposite the rear surface 166. The front surface 164 is adjacent to the light emitting portion 156 of the outer lens 140, and the rear surface 166 is adjacent to and coupled to the inner bezel 146. In one example, the rear surface 166 may include a grain 164' to assist in reflecting light toward the front surface 164, and thus, toward the light emitting portion 156 of the outer lens 140. The grain 164' may be applied by etching, for example, or may result from etching the surface of the injection mold. Generally, the geometries, the front surface 164 and the rear surface 166 of the first optic member 142 are configured to receive light from the remote first light source 120, and to transmit, reflect, and/or refract said light from the first light source 120 to achieve the target lighting requirements.

The second optic member 144 is optically coupled to the second light source 122 to receive the light beam 122' (FIG. 2) for illuminating the second optic member 144. The second optic member 144 is composed of a polymeric material, which is injected molded, extruded, printed, etc. The second optic member 144 may also be composed of glass. In this example, the second optic member 144 is substantially transparent or clear to receive the colored light from the second light source 122. The second optic member 144 is received within and coupled to the inner bezel 146, and generally has a shape that corresponds with a shape of the second transparent portion 152 of the outer lens 140 such that the illumination of the second optic member 144 substantially illuminates the second transparent portion 152 of the outer lens 140. In this example, the second optic member 144 includes a first end 170, a second end 172, a first or front surface 174 and a second or rear surface 176.

The first end 170 is opposite the second end 172. In this example, the second optic member 144 is asymmetric with respect to an axis S1 as the first end 170 includes a bulbous portion 180. The bulbous portion 180 creates an appearance of a light source when illuminated, as best shown in FIG. 2. With continued reference to FIG. 2, the first end 170 and the second end 172 extend along an axis A4, which is substantially coaxial with the axis A of the second light source 122. A surface area of the second end 172 is designed to receive sufficient light within a radius around the axis A4 that is greater than a radius of build tolerance variations that the interface between the remote light source 102' and the lift gate optical system 104' is restricted to. With reference back to FIG. 4, the front surface 174 is opposite the rear surface 176. The front surface 174 is adjacent to the second transparent portion 152 of the outer lens 140, and the rear surface 176 is adjacent to and coupled to the inner bezel 146. In one example, the rear surface 176 may include a grain 174' to assist in reflecting light toward the front surface 174, and thus, toward the second transparent portion 152 of the outer lens 140. The grain 174' may be applied by etching, for example, or may result from etching the surface of the injection mold. Generally, the geometries, the front surface 174 and the rear surface 176 of the second optic member 144 are configured to receive light from the remote second light source 122, and to transmit, reflect, and/or refract said light from the second light source 122 to achieve the target lighting requirements.

The inner bezel 146 is coupled to the outer lens 140 and to the housing 148 so as to be positioned between the outer lens 140 and the housing 148. The inner bezel 146 receives the first optic member 142 and the second optic member 144 and retains the first optic member 142 and the second optic member 144 in alignment with the respective first light source 120 and the second light source 122. The inner bezel 146 is generally, composed of a polymeric material, and is molded, printed, etc. It should be noted, however, that the inner bezel 146 may be composed of chrome. The inner bezel 146 includes a first end 190, a second end 192, a first side 194, a second side 196 and a body 197 that defines a first chamber 198 and a second chamber 200.

The first end 190 is opposite the second end 192. The first side 194 is opposite the second side 196. The first side 194 and the second side 196 connect the first end 190 and the second side 192. The first side 194, the second side 196, the first end 190 and the second end 192 cooperate to define a perimeter of the body 197 of the inner bezel 146. Generally, the outer lens 140 is positioned over the perimeter of the inner bezel 146. The second side 196 includes a first channel 202 and a second channel 204. The first channel 202 is spaced apart from the second channel 204. The first channel 202 is in optical communication with the first optic member 142 and the first light source 120. The second channel 204 is in optical communication with the second optic member 144 and the second light source 122. Generally, the first channel 202 is aligned with the first light source 120 to receive the light beam 120', and the second channel 204 is aligned with the second light source 122 to receive the light beam 122'. Generally, the first channel 202 directs the light beam 120' into the first optic member 142. Similarly, the second channel 204 directs the light beam 122' into the second optic member 144. In one example, the first channel 202 has a width W1 that is smaller than the second end 162 of the first optic member 142 to direct the light beam 120' into the first optic member 142. The second channel 204 has a width W2 that is greater than the second end 172 of the second optic member 144 to ensure receipt of the light beam 122'. It should be noted that depending upon the design of the first optic member 142 and the second optic member 144, the widths W1, W2 may be greater than or less than the respective second end 162 and the second end 172. The first channel 202 is defined through the second side 196 so as to be in communication with the first chamber 198; and the second channel 204 is defined through the second side 196 so as to be in communication with the second chamber 200.

The body 197 defines the first chamber 198, which receives the first optic member 142. The first chamber 198 has a shape that generally corresponds to the shape of the first optic member 142. In one example, the first chamber 198 is shaped such that the first optic member 142 is received into the first chamber 198. Generally, the first optic member 142 is coupled to the first chamber 198 by ultrasonic welding, plastic-welding, mechanical fasteners, locking tabs, etc. It should be noted that the first optic member 142 may be coupled to either the inner bezel 146 or the outer lens 140. In this example, the first chamber 198 is defined through the body 197 adjacent to the first end 190. The first chamber 198 is separated from the second chamber 200 by a mid-section 206 of the body 197.

The second chamber 200 receives the second optic member 144. In one example, the second chamber 200 is shaped such that the second optic member 144 is received into the second chamber 200. Generally, the second optic member 144 is coupled to the second chamber 200 by ultrasonic welding, plastic-welding, mechanical fasteners, locking tabs, etc. It should be noted that the second optic member 144 may be coupled to either the inner bezel 146 or the outer lens 140. In this example, the second chamber 200 is defined through the body 197 between the mid-section 206 and the second end 192.

The housing 148 is coupled to the lift gate 106 of the vehicle 10. The housing 148 includes a first or front side 210, a second or back side 212, a third side 214 and a fourth side 216. The front side 210 is opposite the back side 212, and the third side 214 is opposite the fourth side 216. Generally, at least one bore 218 extends from the front side 210 through the back side 212. The at least one bore 218 receives a mechanical fastener to couple the housing 148 to the vehicle 10.

The front side 210 defines a recess 220. The recess 220 receives the inner bezel 146, and thus, the first optic member 142 and the second optic member 144, to couple the inner bezel 146, the first optic member 142 and the second optic member 144 to the housing 148. Generally, the inner bezel 146 is press-fit or interference fit into the recess 220, however, the inner bezel 146 may also be secured to the housing 148 via one or more mechanical fasteners, adhesives, ultrasonic welding, etc. In one example, a perimeter of the outer lens 140 may also be received within the recess 220 to couple the outer lens 140 to the housing 148. The perimeter of the outer lens 140 may be coupled to the housing 148 within the recess 220 via ultrasonic welding, for example. It should be noted, however, that various other techniques may be employed to couple the outer lens 140 to the housing 148. The back side 212 of the housing 148 is adjacent to and coupled to the lift gate 106.

The fourth side 216 of the housing 148 defines a first bore 222 and a second bore 224. The fourth side 216 also includes a respective sealing member 226 coupled about each of the first bore 222 and the second bore 224. The first bore 222 is in optical communication with the light beam 120' of the first light source 120, and the second bore 224 is in optical communication with the light beam 122' of the second light source 122. The sealing members 226 are coupled to the fourth side 216 of the housing 148. The sealing members 226 include, but are not limited to, gaskets, which protect the first bore 222 and the second bore 224 from an environment of and surrounding the vehicle 10. It should be noted, however, that the first bore 222 and the second bore 224 may be enclosed by a transparent portion of the housing 148, if desired.

In one example, in order to assemble the lift gate lighting system 100', the first light source 120 and the second light source 122 are coupled to the tail lamp assembly 124 to form the remote light source 102'. The first light source 120 and the second light source 122 may be coupled to the respective one of the recesses 128. The first light source 120 and the second light source 122 are placed into communication with the controller 40, by wiring the first light source 120 and the second light source 122 to the wiring harness associated with the tail lamp assembly 124. The gaskets 118 may be coupled about the first light source 120 and the second light source 122, respectively, to protect the first light source 120 and the second light source 122 from the environment. The tail lamp assembly 124, including the first light source 120 and the second light source 122, may be coupled to the second side body panel 14" of the body 14.

The lift gate optical system 104' may be assembled. With the outer lens 140, the first optic member 142, the second optic member 144, the inner bezel 146 and the housing 148 formed, the housing 148 is coupled to the lift gate 106, via the mechanical fastener received through the at least one bore 218. The first optic member 142 is coupled to the first chamber 198 of the inner bezel 146, and the second optic member 144 is coupled to the second chamber 200 of the inner bezel 146. The inner bezel 146 is positioned within and coupled to the recess 220 such that the first channel 202 is aligned with the first bore 222 and the second channel 204 is aligned with the second bore 224. The outer lens 140 is coupled to the recess 220 over the inner bezel 146, via ultrasonic welding for example, to couple the inner bezel 146 to the housing 148. It should be understood that the above assembly of the lift gate optical systems 104' and the remote light source 102' is the same as the assembly of the remote light source 102" and the lift gate optical system 104", and thus, the assembly of the remote light source 102" and the lift gate optical system 104" will not be discussed herein.

During operation of the vehicle 10, in one example, the controller 40 receives and processes the sensor signals from the automatic headlamp sensing device 42a and the sensor signals from the door ajar sensing device 42b. The controller 40 determines whether the ambient lighting conditions are low (for example, an amount of light measured is below a predefined threshold) and also determines whether the lift gate 106 is in the closed position. If both are true, the controller 40 outputs one or more control signals to the first light source 120 and the second light source 122 of each of the remote light sources 102', 102" to illuminate the lift gate optical systems 104', 104".

Upon receipt of the one or more control signals by the remote light sources 102', 102", the first light source 120 and the second light source 122 of each of the remote light sources 102', 102" generate or output light. The light beam 120' from the each of first light sources 120 passes through the respective one of the first bore 222, the first channel 202 and enters the first optic member 142. The light is reflected by the grain 166', and directed out of the first optic member 142 to illuminate the first optic member 142 in the area 110. The light beam 122' from the each of second light sources 122 passes through the respective one of the second bore 224, the second channel 204 and enters the second optic member 144. The light is reflected by the grain 176', and directed out of the second optic member 144 to illuminate the second optic member 144 in the area 112.

Thus, the lift gate optical systems 104', 104" illuminate the lift gate 106 without requiring a light source to be coupled to or mounted on the lift gate 106. In other words, the remote light sources 102', 102" solely illuminate the lift gate optical systems 104', 104" such that there are no light sources coupled to the lift gate 106. Rather, the remote light sources 102', 102" are spaced a distance apart from the lift gate 106 and are coupled to the body 14 illuminate the lift gate optical systems 104', 104", thereby reducing complexity of the lift gate 106. In this regard, by coupling the first light source 120 and the second light source 122 of each of the remote light sources 102', 102" to the respective first side body panel 14' and second side body panel 14" of the body 14, the first light source 120 and the second light source 122 of each of the remote light sources 102', 102" are in communication with the controller 40 through the wiring harness and/or communication medium associated with the tail lamp assembly 124, and thus, an additional wiring harness may not be required for the lift gate optical systems 104', 104". In addition, the illumination of the areas 110, 112 of the lift gate optical system 104', 104" in cooperation with the tail lamp assemblies 124 coupled to the rear 10' of the vehicle 10 meets the photometric requirement for the vehicle 10.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A vehicle, comprising:
    a body having a lift gate coupled to a rear of the vehicle, the body having a first side body panel opposite a second side body panel, with the lift gate coupled to the rear of the vehicle such that a first side of the lift gate is adjacent to the first side body panel and a second side of the lift gate is adjacent to the second side body panel;
    a door ajar sensing device that observes a position of the lift gate relative to the body of the vehicle and generates sensor signals based on the observation;
    a tail lamp assembly coupled to a first side body panel of the vehicle adjacent to the lift gate, the tail lamp assembly having a housing;
    a first light source that emits a first light beam, the first light source coupled to the housing of the tail lamp assembly at a first location remote from the lift gate;
    a second light source that emits a second light beam, the second light source coupled to the housing of the tail lamp assembly at a second location remote from the lift gate; and
    an optical system coupled to the lift gate having a first optic member aligned with the first light source that receives the first light beam and a second optic member aligned with the second light source that receives the second light beam such that the optical system is illuminated by the first light source at the first location remote from the lift gate and the second light source at the second location remote from the lift gate,
    and the first optic member cooperates with the tail lamp assembly to define a tail light for the vehicle; and
    a controller having a processor that:
    receives the sensor signals from the door ajar sensing device;
    determines the lift gate is in a closed position adjacent to the first side body panel and the second side body panel based on the sensor signals; and
    outputs one or more control signals to the first light source and the second light source to illuminate based on the determination that the lift gate is in the closed position.

2. The vehicle of claim 1, wherein the optical system further comprises a second optic member aligned with the second light source that receives the second light beam to illuminate the second optic member and the second optic member cooperates with the tail lamp assembly to define a reverse light for the vehicle.

3. The vehicle of claim 2, wherein the optical system further comprises an inner bezel that has a body that defines a first chamber that receives the first optic member and a second chamber that receives the second optic member, with a first channel defined through the inner bezel so as to be in communication with the first chamber and a second channel defined through the inner bezel so as to be in communication with the second chamber.

4. The vehicle of claim 3, wherein the optical system further comprises a housing that couples the optical system to the lift gate, the housing including a recess that receives the inner bezel, the housing defining a first bore in communication with the first channel and a second bore in communication with the second channel.

5. The vehicle of claim 4, wherein the first light source is coupled at the first location remote from the lift gate so as to be aligned with the first bore of the housing and the second light source is coupled at the second location remote from the lift gate so as to be aligned with the second bore of the housing.

6. The vehicle of claim 3, wherein the first optic member has a first end opposite a second end, and the first channel has a first width that is less than a width of the second end of the first optic member; and
    the second optic member has a third end opposite a fourth end, and the second channel has a second width that is greater than a width of the second end of the second optic member.

7. The vehicle of claim 1, wherein the light source emits the first light beam along an axis that is substantially perpendicular to a longitudinal axis of the vehicle.

8. A vehicle, comprising:
    a body having a lift gate coupled to a rear of the vehicle, the body having a first side body panel opposite a second side body panel, with the lift gate coupled to the rear of the vehicle such that a first side of the lift gate is adjacent to the first side body panel and a second side of the lift gate is adjacent to the second side body panel;
a door ajar sensing device that observes a position of the lift gate relative to the body of the vehicle and generates sensor signals based on the observation;
a tail lamp assembly coupled to a first side body panel of the vehicle adjacent to the lift gate, the tail lamp assembly having a housing;
a first light source that emits a first light beam, the first light source coupled to the housing of the tail lamp assembly at a first location remote from the lift gate;
a second light source that emits a second light beam, the second light source coupled to the housing of the tail lamp assembly at a second location remote from the lift gate; and
an optical system coupled to the lift gate having a first optic member aligned with the first light source that receives the first light beam and a second optic member aligned with the second light source that receives the second light beam such that the optical system is illuminated by both of the first light source at the first location remote from the lift gate and the second light source at the second location remote from the lift gate, the first optic member cooperates with the tail lamp assembly to define a tail light for the vehicle and the second optic member cooperates with the tail lamp assembly to define a reverse light for the vehicle; and
a controller having a processor that:
receives the sensor signals from the door ajar sensing device;
based on the sensor signals, determines the lift gate is in a closed position adjacent to the first side body panel and the second side body panel, or determines the lift gate is in an opened position spaced apart from the first side body panel and the second side body panel; and
outputs one or more control signals to the first light source and the second light source to illuminate based on the determination that the lift gate is in the closed position.

9. The vehicle of claim 8, wherein the optical system further comprises an inner bezel that has a body that defines a first chamber that receives the first optic member and a second chamber that receives the second optic member, with a first channel defined through the inner bezel so as to be in communication with the first chamber and a second channel defined through the inner bezel so as to be in communication with the second chamber.

10. The vehicle of claim 9, wherein the optical system further comprises a housing that couples the optical system to the lift gate, the housing including a recess that receives the inner bezel, the housing defining a first bore in communication with the first channel and a second bore in communication with the second channel.

11. The vehicle of claim 10, wherein the first light source is coupled at the first location remote from the lift gate so as to be aligned with the first bore of the housing and the second light source is coupled at the second location remote from the lift gate so as to be aligned with the second bore of the housing.

12. The vehicle of claim 8, wherein the first light source emits the first light beam along an axis that is substantially perpendicular to a longitudinal axis of the vehicle.

13. A vehicle comprising:
a body having a lift gate coupled to a rear of the vehicle, the body having a first side body panel opposite a second side body panel, with the lift gate coupled to the rear of the vehicle such that a first side of the lift gate is adjacent to the first side body panel and a second side of the lift gate is adjacent to the second side body panel;
a door ajar sensing device that observes a position of the lift gate relative to the body and generates sensor signals based on the observation;
a tail lamp assembly coupled to the first side body panel of the body adjacent to the lift gate, the tail lamp assembly having a housing;
a first light source that emits a first light beam, the first light source coupled to the housing of the tail lamp assembly and remote from the lift gate;
a second light source that emits a second light beam, the second light source coupled to the housing of the tail lamp assembly and remote from the lift gate;
an optical system coupled to the first side of the lift gate having a first optic member aligned with the first light source that receives the first light beam and a second optic member aligned with the second light source that receives the second light beam such that the optical system is illuminated solely by the first light source and the second light source that are remote from the lift gate, the first optic member cooperates with the tail lamp assembly to define a tail light for the vehicle and the second optic member cooperates with the tail lamp assembly to define a reverse light for the vehicle; and
a controller having a processor that:
receives the sensor signals from the door ajar sensing device;
based on the sensor signals, determines the lift gate is in a closed position adjacent to the first side body panel and the second side body panel, or determines the lift gate is in an opened position spaced apart from the first side body panel and the second side body panel; and
outputs one or more control signals to the first light source and the second light source to illuminate based on the determination that the lift gate is in the closed position.

14. The vehicle of claim 13, wherein the optical system further comprises an inner bezel that has a body that defines a first chamber that receives the first optic member and a second chamber that receives the second optic member, with a first channel defined through the inner bezel so as to be in communication with the first chamber and a second channel defined through the inner bezel so as to be in communication with the second chamber.

15. The vehicle of claim 14, wherein the first optic member and the second optic member each include a grain that reflects light toward a light emitting portion of an outer lens coupled to the inner bezel.

16. The vehicle of claim 13, wherein the optical system further comprises a housing that couples the optical system to the lift gate, the housing including a recess that receives the inner bezel, the housing defining a first bore in communication with the first channel and a second bore in communication with the second channel.

17. The vehicle of claim 13, wherein the first light source is coupled to the housing of the tail lamp assembly so as to be aligned with the first bore of the housing and the second light source is coupled to the housing of the tail lamp assembly so as to be aligned with the second bore of the housing.

18. The vehicle of claim 13, wherein the second light source emits the second light beam along an axis that is substantially perpendicular to a longitudinal axis of the vehicle.

* * * * *